United States Patent [19]

Hamilton

[11] Patent Number: 5,404,436
[45] Date of Patent: Apr. 4, 1995

[54] COMPUTER METHOD AND APPARATUS FOR CONVERTING COMPRESSED CHARACTERS FOR DISPLAY IN FULL SIZE

[75] Inventor: Robert H. Hamilton, Hudson, Mass.

[73] Assignee: Digital Equipment Corporation, Maynard, Mass.

[21] Appl. No.: 800,666

[22] Filed: Nov. 27, 1991

[51] Int. Cl.⁶ ............................................. G06F 15/62
[52] U.S. Cl. .................................. 395/150; 395/151; 364/419.09; 345/26; 345/128; 345/194
[58] Field of Search ............... 364/419.09; 395/150, 395/151, 128; 345/26, 128, 194, 202

[56] References Cited

U.S. PATENT DOCUMENTS

| | | | |
|---|---|---|---|
| 4,163,229 | 7/1979 | Bodin et al. | 340/745 |
| 4,621,340 | 11/1986 | Pokorny et al. | 364/900 |
| 4,670,841 | 6/1987 | Kostopoulos | 364/419 |
| 4,954,979 | 9/1990 | Eibner et al. | 364/900 |
| 5,233,334 | 8/1993 | Takebe et al. | 340/735 |
| 5,233,685 | 8/1993 | Landes et al. | 395/147 |

OTHER PUBLICATIONS

*PostScript Language Reference Manual*, Second Edition, Adobe Systems, Inc. Addison–Wesley Publishing Company, Inc., pp. 271–274 and 339–342, (1991).
*Adobe Font Metric Files Specification*, Version 3.0, Adobe Systems, Inc., pp. 3–31, (1990).
*Inside Macintosh*, vol. VI, Apple Computer Inc., Chapter 12, "The Font Manager" pp. 12-1 to 12-22, (1991).
Scheifler et al., *X Window System*, Second Edition, Digital Press, pp. 555–586 and 750–755, (1990).

*Primary Examiner*—Heather R. Herndon
*Assistant Examiner*—Joe Feild
*Attorney, Agent, or Firm*—Hamilton, Brook, Smith & Reynolds

[57] ABSTRACT

The invention method and apparatus employs font metrics data related to font bitmaps for characters of a desired font. Position offsets of pieces in composite characters are read from the font metrics data and are converted to the appropriate pixel offset to adjust the bitmaps of subject compressed font characters. The adjusted bitmaps of the different pieces of a subject composite character are combined to form a working bitmap which represents each piece of the composite character in full size in the subject font. Screen display of composite characters decompressed to full-size is supported by the formed working bitmaps.

13 Claims, 28 Drawing Sheets

AÀEÈIÌOÒUÙ AÁEÉÍ
UÛ AÃNÑOÕ AÅ AÄE
ÀÈÌÒÙ ÁÉÍÓÚÝ ÂÊÎĈ
àèìòù áéíóúý âêîôû ãñ

¿QUE PASA, SEÑOR?

FIG. 2 A

```
C 75  ; WX 685 ; N K            ; B 77   0   681 712 ;
C 76  ; WX 519 ; N L            ; B 72   0   517 712 ;
C 77  ; WX 981 ; N M            ; B 68  -17  917 712 ;
C 78  ; WX 778 ; N N            ; B 77  -17  693 712 ;
C 79  ; WX 722 ; N O            ; B 33  -17  690 729 ;
C 80  ; WX 593 ; N P            ; B 77   0   580 722 ;
C 81  ; WX 722 ; N Q            ; B 33  -185 690 729 ;
C 82  ; WX 667 ; N R            ; B 77   0   665 722 ;
C 83  ; WX 519 ; N S            ; B 37  -17  505 729 ;
C 84  ; WX 574 ; N T            ; B 9    0   563 722 ;
C 85  ; WX 741 ; N U            ; B 82  -17  660 712 ;
C 86  ; WX 648 ; N V            ; B 10  -17  632 718 ;
C 87  ; WX 944 ; N W            ; B 1   -17  931 718 ;
C 88  ; WX 648 ; N X            ; B -13  0   651 718 ;
C 89  ; WX 611 ; N Y            ; B 2    0   610 718 ;
C 90  ; WX 556 ; N Z            ; B 15   0   532 712 ;
C 91  ; WX 352 ; N bracketleft  ; B 69  -228 349 712 ;
C 92  ; WX 352 ; N backslash    ; B 18  -17  326 773 ;
C 93  ; WX 352 ; N bracketright ; B 11  -228 291 712 ;
C 94  ; WX 611 ; N asciicircum  ; B 28   247 583 712 ;
C 95  ; WX 500 ; N underscore   ; B 0   -116 500 -65 ;
C 96  ; WX 352 ; N quoteleft    ; B 77   467 295 712 ;
C 97  ; WX 556 ; N a            ; B 29  -17  508 525 ;
C 98  ; WX 611 ; N b            ; B 44  -17  583 773 ;
C 99  ; WX 444 ; N c            ; B 33  -17  420 525 ;
C 100 ; WX 611 ; N d            ; B 32  -17  564 773 ;
C 101 ; WX 556 ; N e            ; B 33  -17  522 525 ;
C 102 ; WX 389 ; N f            ; B 13   0   371 773 ; L i fi ; L l fl ;
C 103 ; WX 630 ; N g            ; B 35  -239 587 525 ;
C 104 ; WX 593 ; N h            ; B 43   0   540 773 ;
C 105 ; WX 259 ; N i            ; B 45   0   205 773 ;
C 106 ; WX 296 ; N j            ; B -49 -239 234 773 ;
C 107 ; WX 537 ; N k            ; B 44   0   563 773 ;
C 108 ; WX 259 ; N l            ; B 44   0   204 773 ;
C 109 ; WX 889 ; N m            ; B 33   0   834 525 ;
C 110 ; WX 593 ; N n            ; B 34   0   537 525 ;
C 111 ; WX 593 ; N o            ; B 30  -17  562 525 ;
C 112 ; WX 611 ; N p            ; B 34  -228 584 525 ;
C 113 ; WX 611 ; N q            ; B 33  -228 583 525 ;
C 114 ; WX 370 ; N r            ; B 38   0   358 525 ;
C 115 ; WX 426 ; N s            ; B 38  -17  405 525 ;
C 116 ; WX 389 ; N t            ; B 6   -17  345 658 ;
C 117 ; WX 593 ; N u            ; B 54  -17  543 513 ;
C 118 ; WX 519 ; N v            ; B 4   -17  515 513 ;
C 119 ; WX 815 ; N w            ; B 1   -17  816 513 ;
C 120 ; WX 556 ; N x            ; B 10   0   549 513 ;
C 121 ; WX 556 ; N y            ; B 3   -228 550 513 ;
C 122 ; WX 463 ; N z            ; B 26   0   437 508 ;
C 123 ; WX 611 ; N braceleft    ; B 167 -228 461 758 ;
C 124 ; WX 333 ; N bar          ; B 102 -228 232 712 ;
C 125 ; WX 611 ; N braceright   ; B 146 -228 439 758 ;
C 126 ; WX 926 ; N asciitilde   ; B 172  154 754 460 ;
C 161 ; WX 352 ; N exclamdown   ; B 84  -214 264 508 ;
C 162 ; WX 611 ; N cent         ; B 88  -21  500 712 ;
```

```
C 163 ; WX 611 ; N sterling ; B 51 0 552 729 ;
C 164 ; WX 298 ; N fraction ; B -92 -24 352 729 ;
C 165 ; WX 611 ; N yen ; B 5 -2 612 717 ;
C 166 ; WX 611 ; N florin ; B 110 0 509 773 ;
C 167 ; WX 611 ; N section ; B 72 -228 541 729 ;
C 168 ; WX 611 ; N currency ; B 63 118 538 590 ;
C 169 ; WX 352 ; N quotesingle ; B 102 419 252 712 ;
C 170 ; WX 574 ; N quotedblleft ; B 73 467 514 712 ;
C 171 ; WX 519 ; N guillemotleft ; B 37 36 483 461 ;
C 172 ; WX 315 ; N guilsinglleft ; B 36 36 269 461 ;
C 173 ; WX 315 ; N guilsinglright ; B 35 35 268 460 ;
C 174 ; WX 630 ; N fi ; B 20 0 567 773 ;
```

FIG. 3 A

```
KPX A f -19
KPX A d -37
KPX A c -37
KPX A Y -111
KPX A W -74
KPX A V -111
KPX A U -37
KPX A T -111
KPX A Q -37
KPX A O -37
KPX A G -37
KPX A C -57

KPX B period -74
KPX B Y -56
KPX B W -19
KPX B V -37
KPX B T -38
KPX B A -37

KPX D Y -56
KPX D V -37
KPX D T -74
KPX D A -37

KPX F period -111
KPX F comma -111
KPX F a -37
KPX F A -74

KPX G V -37
KPX G T -37

KPX J A -19

KPX K y -56
KPX K w -56
KPX K v -56
KPX K u -56
KPX K o -56
KPX K hyphen -56
KPX K e -56
KPX K a -37
KPX K S -19
KPX K Q -56
KPX K O -56
KPX K G -56
KPX K C -56

KPX L y -37
KPX L quoteright -111
KPX L Y -111
KPX L W -74
KPX L V -74
KPX L T -111
```

```
KPX O period -74
KPX O comma  -74
KPX O Z -19
KPX O Y -56
KPX O X -19
KPX O W -19
KPX O V -19
KPX O T -38
KPX O A -37
```

FIG. 4 A

```
KPX y c -37
KPX y a -37
                                        28c
KPX z o -19
KPX z e -19
KPX z a -19

KPX zero one -37
EndKernPairs
EndKernData
StartComposites 56
CC Aacute 2 ; PCC A 0 0 ; PCC acute 147 205 ;
CC Acircumflex 2 ; PCC A 0 0 ; PCC circumflex 147 205 ;
CC Adieresis 2 ; PCC A 0 0 ; PCC dieresis 147 205 ;
CC Agrave 2 ; PCC A 0 0 ; PCC grave 147 205 ;
CC Aring 2 ; PCC A 0 0 ; PCC ring 147 205 ;
CC Atilde 2 ; PCC A 0 0 ; PCC tilde 147 205 ;
CC Eacute 2 ; PCC E 0 0 ; PCC acute 88 205 ;
CC Ecircumflex 2 ; PCC E 0 0 ; PCC circumflex 73 205 ;
CC Edieresis 2 ; PCC E 0 0 ; PCC dieresis 73 205 ;
CC Egrave 2 ; PCC E 0 0 ; PCC grave 73 205 ;
CC Iacute 2 ; PCC I 0 0 ; PCC acute -23 205 ;
CC Icircumflex 2 ; PCC I 0 0 ; PCC circumflex -38 205 ;
CC Idieresis 2 ; PCC I 0 0; PCC dieresis -38 205 ;
CC Igrave 2 ; PCC I 0 0 ; PCC grave -38 205 ;
CC Ntilde 2 ; PCC N 0 0 ; PCC tilde 169 205 ;
CC Oacute 2 ; PCC O 0 0 ; PCC acute 156 205 ;
CC Ocircumflex 2 ; PCC O 0 0 ; PCC circumflex 156 205 ;
CC Odieresis 2 ; PCC O 0 0 ; PCC dieresis 146 205 ;
CC Ograve 2 ; PCC O 0 0 ; PCC grave 156 205 ;
CC Otilde 2 ; PCC O 0 0 ; PCC tilde 141 205 ;
CC Scaron 2 ; PCC S 0 0 ; PCC caron 65 205 ;
CC Uacute 2 ; PCC U 0 0 ; PCC acute 181 205 ;
CC Ucircumflex 2 ; PCC U 0 0 ; PCC circumflex 166 205 ;
CC Udieresis 2 ; PCC U 0 0 ; PCC dieresis 166 205 ;
CC Ugrave 2 ; PCC U 0 0 ; PCC grave 166 205 ;
CC Yacute 2 ; PCC Y 0 0 ; PCC acute 101 205 ;
CC Ydieresis 2 ; PCC Y 0 0 ; PCC dieresis 111 205 ;
CC Zcaron 2 ; PCC Z 0 0 ; PCC caron 73 205 ;
CC aacute 2 ; PCC a 0 0 ; PCC acute 88 0 ;
CC acircumflex 2 ; PCC a 0 0 ; PCC circumflex 73 0 ;
CC adieresis 2 ; PCC a 0 0 ; PCC dieresis 73 0 ;
CC agrave 2 ; PCC a 0 0 ; PCC grave 73 0 ;
CC aring 2 ; PCC a 0 0 ; PCC ring 73 0 ;
CC atilde 2 ; PCC a 0 0 ; PCC tilde 73 0 ;
CC eacute 2 ; PCC e 0 0 ; PCC acute 88 0 ;
CC ecircumflex 2 ; PCC e 0 0 ; PCC circumflex 88 0 ;
CC edieresis 2 ; PCC e 0 0 ; PCC dieresis 88 0 ;
CC egrave 2 ; PCC e 0 0 ; PCC grave 73 0 ;
CC iacute 2 ; PCC dotlessi 0 0 ; PCC acute -60 0 ;
CC icircumflex 2 ; PCC dotlessi 0 0 ; PCC circumflex -75 0 ;
CC idieresis 2 ; PCC dotlessi 0 0 ; PCC dieresis -75 0 ;
CC igrave 2 ; PCC dotlessi 0 0 ; PCC grave -75 0 ;
CC ntilde 2 ; PCC n 0 0 ; PCC tilde 92 0 ;
```

FIG. 4 B

```
CC oacute 2 ; PCC o 0 0 ; PCC acute 82 0 ;
CC ocircumflex 2 ; PCC o 0 0 ; PCC circumflex 82 0 ;
CC odieresis 2 ; PCC o 0 0 ; PCC dieresis 92 0 ;
CC ograve 2 ; PCC o 0 0 ; PCC grave 92 0 ;
CC otilde 2 ; PCC o 0 0 ; PCC tilde 92 0 ;
CC scaron 2 ; PCC s 0 0 ; PCC caron 8 0 ;
CC uacute 2 ; PCC u 0 0 ; PCC acute 82 0 ;
CC ucircumflex 2 ; PCC u 0 0 ; PCC circumflex 92 0 ;
CC udieresis 2 ; PCC u 0 0 ; PCC dieresis 92 0 ;
CC ugrave 2 ; PCC u 0 0 ; PCC grave 92 0 ;
CC yacute 2 ; PCC y 0 0 ; PCC acute 73 0 ;
CC ydieresis 2 ; PCC y 0 0 ; PCC dieresis 73 0 ;
```

```
ENDCHAR
STARTCHAR B
ENCODING 66
SWIDTH 648 0
DWIDTH 12 0
BBX 10 13 1 0
BITMAP
FF00
FF80
E3C0
E1C0
E3C0
FF80
FF80
E3C0
E1C0
E1C0
E3C0
FF80
FF00
ENDCHAR
STARTCHAR A
ENCODING 65
SWIDTH 704 0
DWIDTH 13 0
BBX 13 13 0 0
BITMAP
0700
0700
0F80
0D80
1DC0
18C0
18C0
3FE0
3FE0
7070
7070
E038
E038
ENDCHAR
STARTCHAR at
ENCODING 64
SWIDTH 1000 0
DWIDTH 18 0
BBX 13 12 2 1
BITMAP
0FC0
3020
4390
4448
8848
8888
9088
```

FIG. 5 B

```
9190
92A0
4C48
2010
1FE0
ENDCHAR
STARTCHAR question
ENCODING 63
SWIDTH 500 0
DWIDTH 9 0
BBX 7 13 1 0
BITMAP
``` from 27

FIG. 7 A

```
BITMAP
F8
ENDCHAR
STARTCHAR mu
ENCODING -1
SWIDTH 593 0
DWIDTH 10 0
BBX 11 13 0 -4
BITMAP
6180
6180
6180
6180
6180
6180
6180
7180
6FE0
6000
6000
E000
C000
ENDCHAR
STARTCHAR circumflex
ENCODING 195
SWIDTH 410 0
DWIDTH 7 0
BBX 5 2 0 11
BITMAP
70
D8
ENDCHAR
STARTCHAR acute
ENCODING 194
SWIDTH 410 0
DWIDTH 7 0
BBX 3 2 2 11
BITMAP
60
C0
ENDCHAR
STARTCHAR grave
ENCODING 193
SWIDTH 410 0
DWIDTH 7 0
BBX 4 3 2 11
BITMAP
C0
60
30
ENDCHAR
STARTCHAR ntilde
ENCODING -1
SWIDTH 593 0
```

FIG. 7 B

```
DWIDTH 11 0
BBX 9 12 1 0
BITMAP
1A00
2C00
0000
EF00
FF80
F380
E380
E380
E380
```

FIG. 9A

```
ENDCHAR
STARTCHAR Agrave
ENCODING -1
SWIDTH 704 0
DWIDTH 13 0
BBX 11 13 1 0
BITMAP
0C00
0600
0000
0E00
1F00
1B00
3B80
3180
3180
7FC0
7FC0
E0E0
E0E0
ENDCHAR
STARTCHAR Aring
ENCODING -1
SWIDTH 704 0
DWIDTH 13 0
BBX 11 13 1 0
BITMAP
0E00
1100
0E00
0E00
1F00
1B00
3B80
3180
3180
7FC0
7FC0
E0E0
E0E0
ENDCHAR
STARTCHAR Atilde
ENCODING -1
SWIDTH 704 0
DWIDTH 13 0
BBX 11 13 1 0
BITMAP
0D00
1600
0000
0E00
1F00
1B00
3B80
```

26 → (pointing to Agrave block, labeled 21)

FIG. 9 B

```
3180
3180
7FC0
7FC0
E0E0
E0E0
ENDCHAR
STARTCHAR Ccedilla
ENCODING -1
SWIDTH 537 0
DWIDTH 10 0
BBX 9 16 1 -3
```

AÀEÈIÌOÒUÙ AÁEÉIÍ(
UÛ AÃNÑOÕ AÅ AÄEÏ
ÀÈÌÒÙ ÁÉÍÓÚÝ ÂÊÎÔÏ
àèìòù áéíóúý âêîôû ãñõ

¿QUE PASA, SEÑOR?

```
18C0
18C0
3FE0
3FE0
7070
7070
E038
E038
ENDCHAR
STARTCHAR Adieresis
ENCODING 196
SWIDTH 704 0
DWIDTH 13 0
BBX 13 16 0 0
BITMAP
0D80
0D80
0000
0700
0700
0F80
0D80
1DC0
18C0
18C0
3FE0
3FE0
7070
7070
E038
E038
ENDCHAR
```

```
STARTCHAR Agrave
ENCODING 192
SWIDTH 704 0
DWIDTH 13 0
BBX 13 17 0 0
BITMAP
0C00
0600
0300
0000
0700
0700
0F80
0D80
1DC0
18C0
18C0
3FE0
3FE0
7070
7070
E038
E038
ENDCHAR
```
} 101

```
STARTCHAR Aring
ENCODING 197
SWIDTH 704 0
DWIDTH 13 0
BBX 13 18 0 0
BITMAP
0600
0900
0900
0600
``` from 101

AÀEÈIÌOÒUÙ AÁEÉÍ
UÚ AÃNÑOÕ AÅ AÄE
ÀÈÌÒÙ ÁÉÍÓÚÝ ÂÊÎĈ
àèìòù áéíóúý âêîôû ãñ

¿QUE PASA, SEÑOR?

FIG. 14

COMPUTER METHOD AND APPARATUS FOR CONVERTING COMPRESSED CHARACTERS FOR DISPLAY IN FULL SIZE

BACKGROUND OF THE INVENTION

When processing documents, computer systems are capable of displaying and printing character data in many different fonts. A font is a collection of characters and symbols of a particular style and size. Each font includes all of the letters, numbers, and other symbols which are generally required to produce a typical document in a language whose alphabet is part of the font.

A typeface is a particular design of type which can be rendered in any number of fonts which have particular typographer's point sizes. Typefaces are grouped in families. An example of a typeface family is Helvetica. (Helvetica is a trademark of Linotype-Hell AG and/or its subsidiaries.) Other families include Times and Shannon. (Times is a trademark of Linotype-Hell AG and/or its subsidiaries; Shannon is a trademark of Agfa Corp.) Helvetica Oblique is one typeface in the Helvetica family. Other typefaces in the family may include Helvetica Roman and Helvetica Italic. Within the Helvetica Oblique typeface, there is a separate font for each point size. That is, Helvetica Oblique 18 point, Helvetica Oblique 24 point, and Helvetica Oblique 36 point are all individual fonts in the Helvetica Oblique typeface. Fonts can be provided to computer systems in more than one version, for example, one for display monitors with 75 dots per inch resolution and one for 100 dpi monitors.

The format of the data used to represent fonts in computer systems depends upon the application program used to process the document and the mode in which the document is presented. If the application is to hard copy print the document, it may use outline font data to lay out the page for printing. Outline font data defines points in characters and how the points should be connected.

The application may lay out a page for display on a computer workstation monitor prior to printing. In that case, the application uses font metrics data to determine the amount of space in the document occupied by the text. Among other details, font metrics data defines the width of each character in the font, including composite characters, i.e., characters which are composed of more than one piece. This information is used by the application to set up the page for monitor display so that the displayed page represents as accurately as possible what a printed page will look like.

Fonts are presented to a computer display system in a bitmap data format. In this format, each character in the font occupies a rectangular grid or matrix of pixels. That is, a multiplicity of pixels is arranged in a series of same length rows, and each pixel is set to either an ON or an OFF state which is represented by a 1 or a 0 data bit, respectively. The pixels in the ON state provide an image of the font character in the grid or matrix of pixels.

In some common computer display systems, the height of each text line is strictly defined. None of the characters in the text may be taller than a height restriction imposed by the display system. When the text is composed in the English language, this rarely presents a problem. The capital letters in the font are all the same height. They extend up to or very close to the maximum allowable height to ensure clarity when they are displayed.

In many other languages, however, this height restriction presents a problem. Some non-English alphabets include characters which are taller than the capital letters. These characters are usually capital letters with accents or diacritical marks above them. Ideally, these accented capital letters are taller than the rest of the capital letters in the alphabet. In fact, an accented capital letter is simply the base capital letter with the accent added on top. In computer display systems with character height restrictions, accented capital letters cannot be presented in this ideal manner. Since the base capital letters extend to the height limit, adding an accent on top would cause a violation of the height restriction, and the character could not be displayed. To date, the approach used by many popular systems to display accented capital letters is to shorten or compress the base letter sufficiently to allow the composite character (i.e., base letter plus accent or diacritical mark) to comply with the height restriction. The result is that all of the capital letters in the alphabet, including the ones which are base letters of composite characters, are not the same height on the display.

As mentioned above, font bitmaps are used by computer display systems to display characters on a computer workstation monitor. In general, one piece of a composite character, called the "base piece," is the capital letter without any accent. A major part of the bitmap represents the base piece. The remaining portion of the bitmap represents a second piece of the composite character which is the accent. To accommodate the height restriction, the base piece is not identical to its corresponding capital letter. It is compressed vertically so that it does not extend to the height limit. When the accent piece portion of the bitmap (which may also be compressed) is combined with the compressed capital letter portion, the bitmap of the resulting composite character extends to, but not above, the height limit. The composite character is approximately the same overall size (especially heightwise) as the unaccented capital letters in the font.

Among other items, commercial vendors of fonts supply the font bitmaps to purchasers of fonts. Because computer displays with height restrictions are so common in the industry, the bitmaps include representations of these accented compressed capital letters. As a result, even if a purchaser uses the font bitmaps on a computer display which does not restrict the height of characters, the bitmap presents, and hence the display system displays the accented capital letters with the capital letter portions in compressed form.

To resolve the foregoing situation, a human type designer and special font bitmap editing software and hardware is required to expand or replace the accented capital letters in the font bitmap. In particular, the type designer uses a font editor program and makes changes to each accented character by hand. Typically the font editor program is a very useful windowing application program that uses a graphical user interface to enable selection, modification, and creation of font bitmaps. However, the process for replacing compressed capital letters, with the font editor program still involves many manual steps.

First, the type designer uses the font editor to select an accented capital letter and erases it. He then selects a "base" character, such as "A" copies it to the "clipboard" window, and copies it again to the accented character position. Finally, he either selects an accent shape from another character, or creates such a shape drawing upon his type design experience. That shape is superimposed on the new bitmap character in a position that seems most appropriate to the type designer. This process is then repeated for each accented capital letter in the font.

Hence disadvantages of the foregoing font bitmap editing process include:

- the amount of time involved considering the numerous (about 20–30) accented capital letters in commonly used fonts for which the process would have to be repeated;
- the increased possibility of unrelated inadvertent modifications to a font due to the process normally being performed in several edit passes (human error); and
- the addition of accents of inconsistent weights and shapes due to the subjectivity of the type designer throughout the process.

SUMMARY OF THE INVENTION

The present invention overcomes the foregoing shortcomings of the prior art. In particular, the present invention provides a computer method and apparatus for converting compressed composite characters to decompressed (full height) form independent of user interaction for display on computer display systems having no character height restrictions.

Specifically, in the present invention corresponding font metrics files and display font bitmaps for characters of desired fonts are provided and held in a working memory. The display font bitmaps of a font provide representations of at least (a) full sized characters including capital letters, (b) full sized diacritical marks, and (c) compressed characters in the font.

For each desired compressed character selected from the provided display font bitmaps, the present invention converts the provided display font bitmap representation of the character to a working representation of the character decompressed to full-size. This is automatically accomplished by a processor routine, executed without user interaction and using the font metrics files in the working memory. The present invention then substitutes the working representations for the provided display font bitmap representations of the selected compressed characters. Consequently a computer display system free of character height restrictions is able to display the characters in full-size from the display font bitmaps as modified by the working representations.

In a preferred embodiment, the compressed characters selected for conversion are accented capital letters. These are composite characters formed of a compressed capital letter as a base piece and an accent piece (or diacritical mark). Just as each character in the font has a unique bitmap representation, each of the pieces in a composite character has its own individual bitmap representation. Conversion of the bitmap representation of a composite character in the present invention involves combining the bitmap for the full-sized corresponding capital letter and the bitmap for an accent piece. A single working bitmap for a decompressed full-sized accented capital letter results.

Oftentimes, the font metrics files, among other things, define how composite characters are assembled for printing. For example, for each accented capital letter of a font, the font metrics file corresponding to that font defines the offset between a normally sized base capital letter and the accent piece. This information can be used by certain application programs accessing the font to control or modify the placement of accent pieces for printing.

In the present invention, however, data from font metrics files is used to create display bitmaps for full-sized accented capital letters. The invention converts the font metrics offset data to pixel offsets compatible with the provided display font bitmaps. It then uses these pixel offsets to properly combine the bitmap for the full-sized capital letter and the bitmap for the accent piece into a single working bitmap for a full-sized (decompressed) accented capital letter.

In a preferred embodiment of the invention, the provided display font bitmap is stored in a bitmap distribution format (BDF) file. The invention reads the bitmap data and the font metrics data from respective files. The bitmaps for the accented capital letters are converted using the font metrics data as described above. Then, a new or modified BDF file is created by the working bitmaps substituted for the initially provided bitmaps of the selected desired compressed characters. This new BDF file thus contains the bitmaps for the full-sized accented capital letters, and the bitmaps of the old compressed letters are discarded. A computer display system of interest to the present invention then reads bitmap data from this new BDF file to support display of the selected characters in decompressed full size in the subject font.

Hence, the invention provides a computer display system with improved display quality. All of the letters in a font can be displayed on a computer display system supported by the bitmaps converted by the invention as they should actually appear, as opposed to being compressed. Accented capital letters therefore are not displayed in a compressed, distorted fashion. In turn, computer displays driven by the bitmap converted by the invention more accurately represent the printed page. Outline fonts provide for full-sized accented capital letters when printing. If bitmaps are not converted however, screen displayed accented capital letters appear compressed. Therefore, with unconverted bitmaps, the display and the printed page are not the same. With the bitmap conversion of the present invention, the accented capital letters are full-sized and, therefore, a screen display looks the same as the printed page.

Because the present invention provides a processor routine for automatically, without user interaction, converting bitmaps of compressed characters into bitmaps of the corresponding full-sized characters, the present invention overcomes the time, inadvertent modification and inconsistency problems of prior art. The time required to make such conversions is dramatically reduced and subjectivity on the type designers part is removed by the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A and B illustrate a page from a font metrics file listing metrics information for characters in a certain font.

FIGS. 3A and B illustrate a page from a font metrics file listing character kern pairs for the font.

FIGS. 4A and B illustrate a page from a font metrics file listing data which defines composite characters in the font.

FIGS. 7A and B illustrate a page from a bitmap distribution format file including data for the grave accent piece in the font.

FIGS. 9A and B illustrate a page from a bitmap distribution format file including data for the compressed Agrave character in the font.

FIG. 11 illustrates how compressed accented capital letters appear on a screen display with other characters in a font.

FIGS. 12A and B illustrate a page from a bitmap distribution format file after conversion by the present invention such that the file includes data for a decompressed Agrave character.

FIG. 14 illustrates how decompressed accented capital letters formed by the present invention appear on a display with other characters in a font.

DETAILED DESCRIPTION OF THE INVENTION

Figure 1:
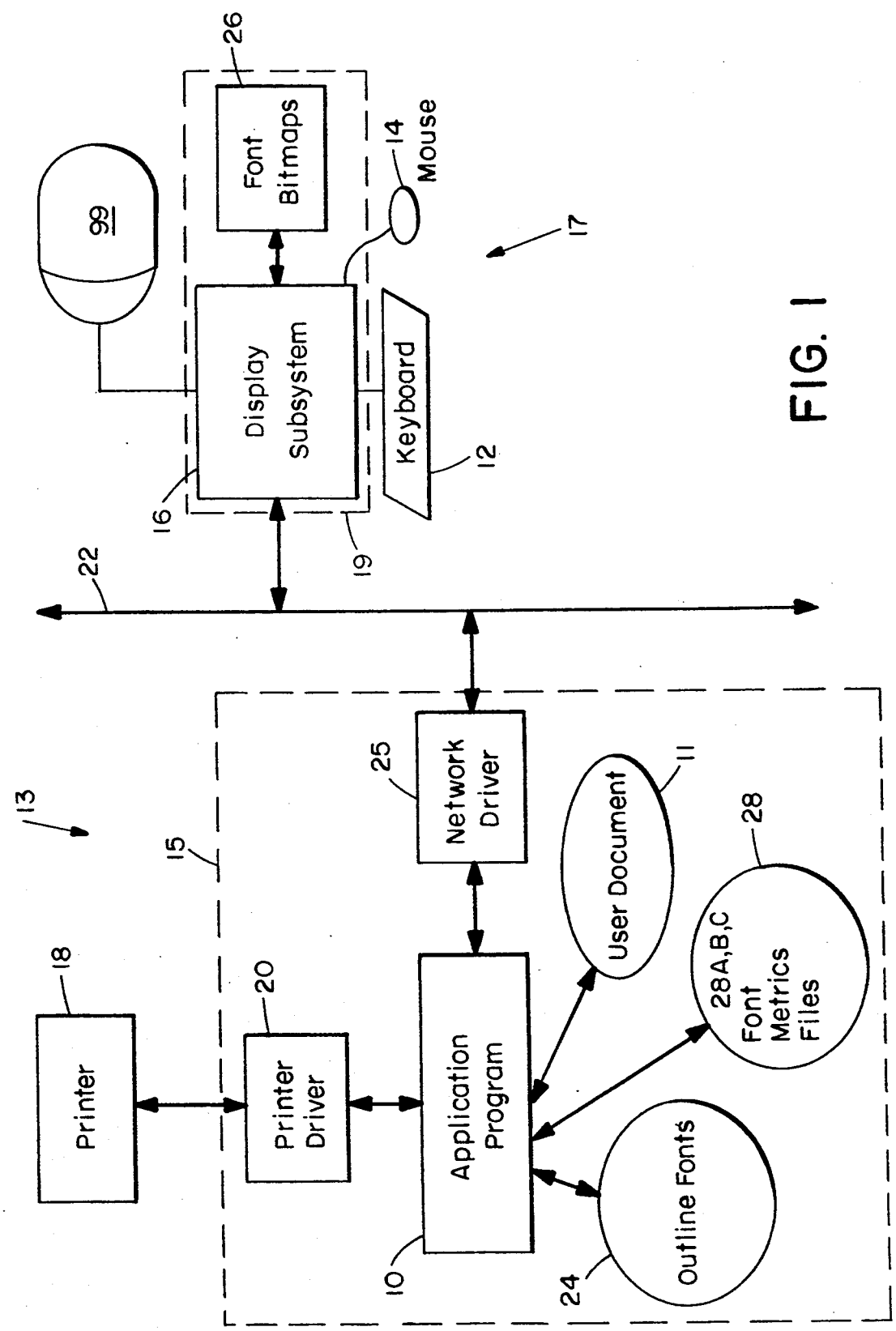
FIG. 1 is a block diagram of a computer system which processes user documents.

FIG. 1 is a block diagram depicting a typical networked computer system 13 having a host processor 15 and one or more user workstations 17. For simplicity only one workstation 17 is shown. Each workstation 17 is linked to the host processor 15 through network interconnect 22 and includes a working memory 19 (e.g., a digital processing unit) and I/O devices (e.g., keyboard 12, mouse 14 and display monitor 99).

In particular, FIG. 1 illustrates the interfacing of the various system components required for processing a user text document 11. The system user controls the process via application program 10 executed by host processor 15. By inputting commands with the keyboard 12 or the mouse 14 at the user workstation 17, the user can manipulate the document 11 in any fashion allowed by the application 10.

The computer network system 13 presents the document 11 in human readable form through either or both of (i) the display unit 99 supported by the display subsystem 16 at the user workstation 17, and (ii) the printer 18 locally or remotely coupled to host processor 15. Specifically, the application 10 transmits print data to the printer 18 via a printer driver 20. The application 10 transmits display data to the display subsystem 16 over the system network interconnect 22 via the network driver 25. Each of these processes, printing and displaying, requires a particular data format to function. For example, when printing text, outline fonts 24 are used to present characters to the printer 18. When displaying the same text in a screen view on display unit 99, font bitmaps 26 are used to present characters to the display subsystem 16 which drives display unit 99.

Typically, fonts are purchased by users from commercial font vendors like Adobe Systems Incorporated (incorporated in the State of California) and Agfa Corp. (incorporated in the State of New York). These vendors supply the fonts in files stored on some portable medium, such as but not limited to floppy disks, magnetic tape, and the like. Several files can be included with each typeface. These files include outline font files 24, font metrics files 28, and bitmap font files 26. Some vendors supply bitmap fonts in bitmap distribution format (BDF) files.

A process, called a printer interpreter, resident on the printer 18 uses the outline font files 24 to create characters in the font for use during printing. The application 10 uses the font metrics 28 to format data compatible with the printer 18. The application 10 then transmits the data to the printer 18 via the printer driver 20. One example of a printer interpreter and compatible outline font is the PostScript interpreter and PostScript outline fonts by Adobe Systems Incorporated.

Font metrics files 28 provide data which defines how characters will be rendered on the printer 18 by the printer interpreter. The files 28 are used by the application 10 to determine how characters will be sized when they are printed. This allows the application 10 to lay out a document page for display so the user can view through display unit 99, prior to printing, an accurate representation of what the printed page will look like.

In the preferred embodiment, in the font metrics file 28, each character is defined in relation to a character coordinate system. In this coordinate system, the traditional typographer's em square is partitioned horizontally and vertically into 1000 equally spaced divisions hereinafter referred to as metrics units. In most Indo-European alphabets, including Roman, the origin of the coordinate system is the point at the far left end of the character base line. The base line is the line which defines the bottoms of the majority of characters in the font. The horizontal axis of the coordinate system is the x axis, and the vertical axis is the y axis. In the font metrics file 28, all of the character data is listed in metrics units.

The font metrics file 28 of a font is divided into three sections 28a, 28b, 28c. The first section 28a contains character metrics data. Each Character of the subject font is listed with its width and bounding box definition. The bounding box of a character is the smallest rectangle which encloses the entire character. FIGS. 2A and B illustrate one typical page of entries from the first section 28a of the font metrics file 28 of Shannon Bold 18-point font. As an illustration, the seventh line on the page of FIG. 2A is the data for a capital Q. The first entry in that line is the code for the character. The code used in this illustration is the International Standards Organization (ISO) Latin 1 encoding scheme. Under this scheme, the Q is encoded as "81". Next, the width of the character with appropriate spaces is given. The Q is 722 metrics units wide. The next entry is the name of the character. Finally, the bounding box of the Q is defined in relation to the origin of the character coordinate system. The four entries in order are the minimum x coordinate, minimum y coordinate, maximum x coordinate, and maximum y coordinate of the Q character. These four coordinates define the character only, excluding any spaces. It should be noted that the minimum y coordinate is −185, which means that the Q extends 185 metrics units below the origin in the y direction.

The second section 28b of the font metrics file 28 lists kern pairs. Kern pairs are pairs of characters in the font which, when printed together in order with the spaces allowed by their definitions, will not appear properly spaced on a printed page. The kern pair data is a horizontal (x direction) offset in metrics units of the second character in the pair. When the position of the second character is offset according to the data, the pair of characters will look correct on a printed page. An example of such a pair of characters is AV. If they are printed according to their strict definitions, they will appear to be spaced too far apart. The kern pair offset data for AV is shown in the FIGS. 3A and B illustration of second section 28b. FIGS. 3A and B illustrate another page from the same font metrics file 28 as FIGS. 2A and B but from the second section 28b of file 28. The entry for AV shows that whenever the two characters are to be printed together, the V should be shifted 111 metrics units to the left (-x direction). When this is done, the spacing for the AV pair is correct.

The third section 28c of the font metrics file 28 defines how composite characters are assembled by the printer interpreter. FIGS. 4A and B illustrate another page of data from the same font metrics file 28 but from the third section 28c of file 28. The fourth line of the composite data defines the Agrave character—a capital A with a grave accent over it. The first entry in the data line is "CC" followed by the name of the composite character with the number of pieces it contains, in this case, two. Next, the first piece of the composite character (PCC) is defined. The first piece is the capital A. The two numbers following are the offsets in metrics units in the x and y directions of the bounding box of the piece with respect to the bounding box of the base piece of the composite character. Since the A is the base piece, the offsets are both zero. The next and last composite piece is the grave accent piece. The offset data indicates that in order for the printer to construct a proper Agrave character, it must shift the grave accent piece. Specifically, the x coordinate of the bounding box of the grave piece must be moved by 147 metrics units in the positive x direction. The y coordinate of the grave piece must be offset by 205 metrics units in the positive y direction. After these offsets are added to the coordinates of the grave piece, the A and the grave piece can be printed together as one character (i.e., the grave accented A).

Font vendors also provide the user with bitmap distribution format (BDF) files 26 (FIG. 1). These bitmap fonts 26 are designed to provide display screen representations that correspond to outline fonts 24. For each character, a font bitmap defines each pixel in a rectangular grid of pixels as either ON or OFF by a 1 or a 0 data bit, respectively, depending upon the shape and location of the character within the grid. FIGS. 5A and B are a page from the BDF file 26 for the Shannon Bold 18-point font. The line "STARTCHAR A" is the beginning of the bitmap definition 27 of the capital letter A. The next line indicates that the ISO Latin 1 code for A is 65. Next, the scalable width (SWIDTH) in x and y is given. This is the ideal width of the character measured in metrics units. The width of an A is 704 metrics units. The y value is zero. The DWIDTH data defines a vector in pixel units in x and y which points from the origin of the present character (A) to the origin of the next character to be displayed. This data is measured in pixels. So, the origin of the character displayed after the A is 13 pixels to the right of the origin of the A.

Figure 5:
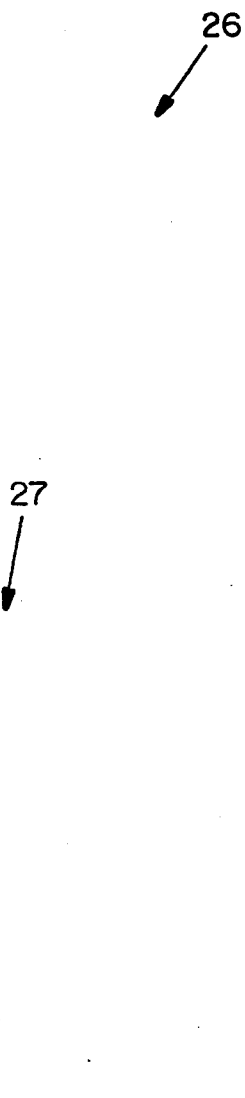
FIGS. 5A and B illustrate a page from a bitmap distribution format file including data for the capital A character in the font.

The bounding box (BBX) of the character is then defined in pixel units. The first numeric figure (i.e., 13) is the width in x of the bounding box. Next is the height (i.e., 13) in y. The last two entries are the pixel displacements in x and y of the lower left corner of the bounding box from the origin of the character. The actual bitmap data 29 of the character is then listed line by line in hexadecimal format. Each line of bitmap data 29 represents a line of pixels in the grid of pixels. The four hexadecimal digits can actually define a character 16 pixels wide. However, the A is only 13 pixels wide. It can be seen from the data that the three least significant bits in the data are always zero. Only 13 pixels across are active. The bitmap data 29 for the A ends with the word ENDCHAR (FIG. 5).

Figure 6:
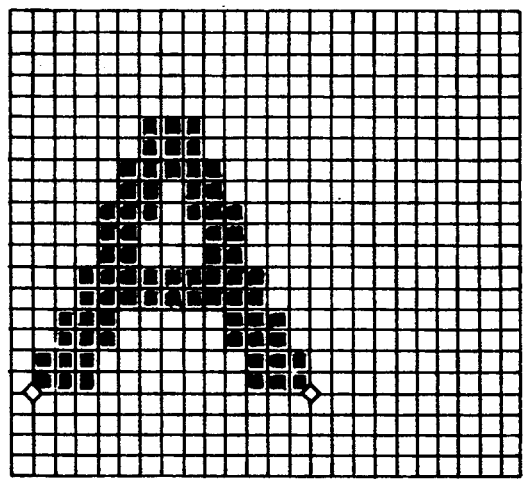
FIG. 6 is an illustration of a bitmap representation for the capital A and corresponding rendering of the character on a screen display.

FIG. 6 shows the grid of pixels for the A as defined by the bitmap definition 27 of FIG. 5A. The bitmap data 29 (FIG. 5A) starts at the left edge of the letter itself, not the grid in FIG. 6. The first line of data, 0700, defines the top line of the A starting in the second column of pixels (the first column of pixels within the bounding box). The last line of data, E038, defines the last line of pixels within the bounding box.

When the application 10 (FIG. 1) commands screen display of text, it first looks at the font metrics file 28 to determine the widths of all the characters it is to display. It uses the metrics data, kern pair offsets, and composite character definitions to determine how the printer interpreter will eventually lay out the document for printing. Based on that determination, application 10 lays out the document page for screen display on display unit 99 so that the screen view represents as accurately as possible what the printed page will look like. After laying out the document page, the application 10 commands the display subsystem 16 to display the subject document page on display unit 99. The display subsystem 16 takes character data from the BDF file 26 and displays a screen view of the text according to that data.

Various types of display subsystems 16 (or more generally computer display systems) exist in the computer industry. The more common types require that none of the characters in a line of text extend beyond a specific height limit. In most documents produced in the English language this restriction is of no consequence. Fonts are created in which all the capital letters are the same height and extend up to or very close to the height restriction. In many other languages, however, letters (and in particular composite characters formed of plural pieces) are formed with diacritical marks or accents. These accents are usually added to the top of a letter. For example, an Agrave character is simply an "A" with a grave accent added on top. Displaying this character on a display subsystem 16 with a character height restriction presents a problem. Since the "A" itself already extends to the height limit, adding the accent piece will cause the composite character to violate the height restriction. The display subsystem 16 will not be able to display the character.

In order to accommodate the character height restriction of these very common display subsystems 16, font vendors modify the shape of the base capital letters of composite characters. The base letter is made shorter or compressed vertically so that when the accent piece is added, the composite character will comply with the height restriction. Thus, the bitmap font files 26 supplied with a commercial typeface provide bitmaps of compressed capital letters as the base pieces of composite accented capital letters.

Using the Agrave composite character as an example, FIGS. 5A–10 illustrate the compressed nature of capital letters in composite characters by the BDF file 26. For purposes of illustration and not limitation, the font in all of these figures is Shannon Bold 18 point. FIGS. 5A and B and 6, as discussed above, show the bitmap definition 27/data 29 of a full-sized capital A and how that data renders the character on a screen display. FIGS. 7A and B and 8 show the same for the grave accent piece. Specifically, the BDF file 26 bitmap definition 23 of the grave accent starts with the line "STARTCHAR grave" and ends with "ENDCHAR" with actual bitmap data included therebetween. Ideally, in forming the Agrave character., these two pieces (capital A and grave accent) should simply be combined, with the grave piece on top of the capital A piece. However, in order to meet the height restriction, the capital A is compressed first, and then the grave accent is added on top.

FIGS. 9A and B and 10 show the resulting bitmap definition 21 in BDF file 26 and the Agrave composite character. The completed composite character with the accent piece is 13 pixels high, the same height as the unaccented capital A by itself. So, the "capital A" piece of the composite character has been compressed to make the resulting composite character the same height as the unaccented capital letters in the font. Referring to FIGS. 9A and B, it can be seen that the base A piece in the composite is described by only ten lines of data, whereas, in FIGS. 5A and B, the unaccented capital A is defined by thirteen lines of data. This can also be seen visually by referring to FIGS. 10 and 6 and counting the rows of pixels.

It should be noted that the accent piece itself has also been compressed to form the composite Agrave character. The accent piece by itself spans three rows of pixels (FIGS. 7A and B and 8) but, within the composite, it only spans two rows of pixels (FIGS. 9A and B and 10).

FIG. 11 illustrates how characters of a font with compressed accented capital letters appear in screen views of a display unit 99 driven by a display subsystem 16. The side-by-side comparison of accented letters with their corresponding unaccented versions exhibits the inconsistency in screen display quality between the two types of characters. This is particularly striking when there is only one compressed letter in a line of full-sized letters.

Some display subsystems 16 do not have character height restrictions. They are capable of displaying these accented capital letters as they should normally appear and do appear in printed form. However, commercial font vendors provide some font bitmaps with compressed accented capital letters because of the prevalence in the industry of display subsystems 16 with height restrictions. So, even though a display subsystem 16 could present a full-sized accented capital letter, when using commercially available bitmaps, it will only display compressed versions.

In accordance with the present invention, the alternative to using bitmaps which provide representations of composite characters (e.g., accented capital letters) in compressed form is to convert the bitmaps to provide representations of composite characters (accented capital letters) in full size. The present invention performs that conversion in a completely automated fashion (i.e., without user interaction). As a result, the present invention accomplishes the bitmap conversion in a time saving, error minimizing and consistent manner compared to that of prior art. To that end, the resulting decompressed composite characters (especially accented capital letters) have parts (e.g., accents) of consistent weights and shapes, and the resulting font remains free of stray inadvertent modifications that a type designer of prior art would have caused.

Figure 8:
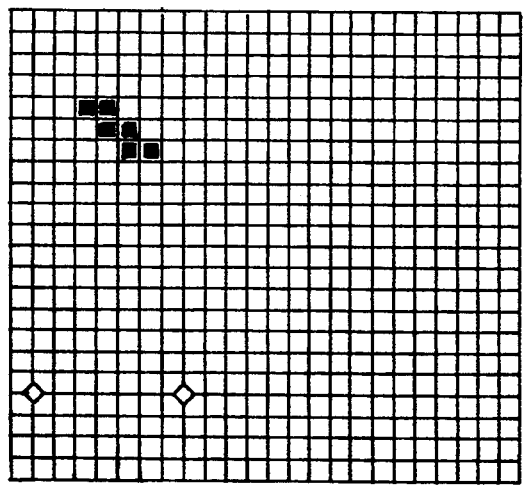
FIG. 8 is an illustration of a bitmap representation for the grave accent piece and corresponding rendering of the piece on a screen display.
Figure 10:
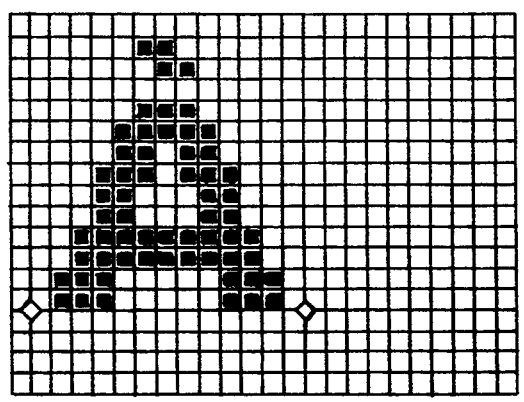
FIG. 10 is an illustration of a bitmap representation for the compressed Agrave and corresponding rendering of the character on a screen display.
Figure 13:
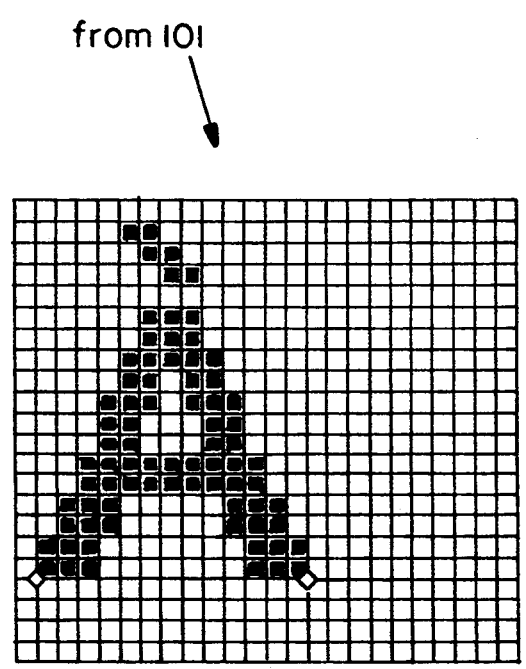
FIG. 13 is an illustration of a bitmap representation for the decompressed Agrave and corresponding rendering of the character on a screen display pursuant to the present invention.

FIGS. 12A and B and 13 illustrate the results of the present invention bitmap conversion. FIGS. 12A and B illustrate a page from a BDF file 26' (FIG. 17) which has been converted by the present invention. The illustrated page includes the bitmap definition/data 101 for the converted Agrave character. FIG. 13 shows how that composite character is rendered on a screen display. Comparison of FIGS. 6, 8, and 13 shows that the decompressed composite character is simply the combination of the full-sized capital A and the grave accent piece. The grave piece has been offset in both the horizontal (x-axis) and vertical (y-axis) directions and then superimposed on the full sized capital letter A. This can also be seen by comparing the bitmap data of FIGS. 5A and B, 7A and B and 12A and 12B.

FIG. 14 shows how decompressed, full sized accented capital letters appear in a screen display with the other characters in a font. More specifically, FIG. 14 illustrates the same sequence of characters as FIG. 11 but with the decompressed, full sized composite characters provided by the present invention. The side-by-side comparison of accented letters to their corresponding unaccented versions exhibits the improved consistency in screen display quality.

Figure 17:
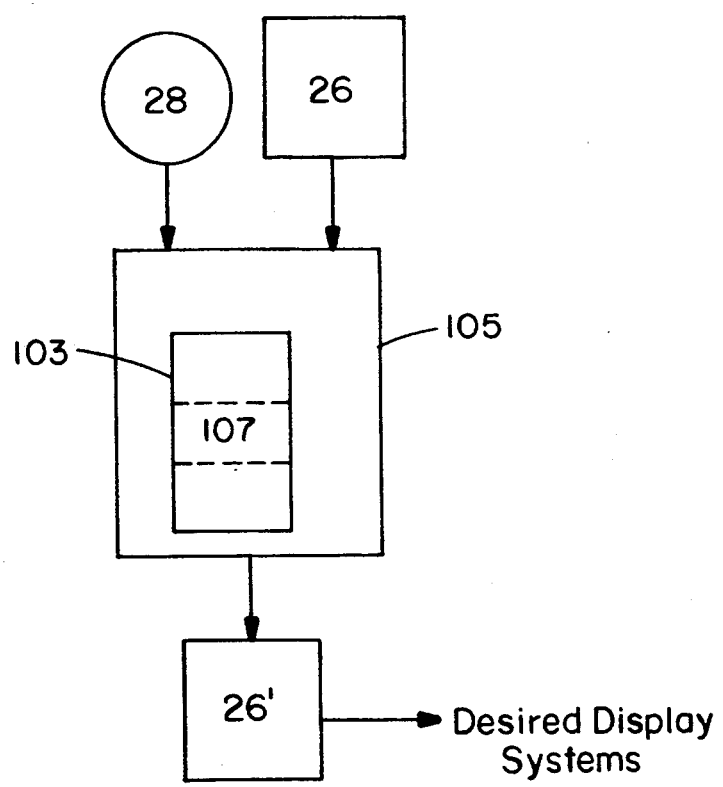
FIG. 17 depicts the present invention in a computer system with input and output files.

In the preferred embodiment, the present invention conversion process is a processor routine 107 employed by a software program 103 written in the C programming language and running on a compatible digital processor 105 as illustrated in FIG. 17. The employing or main program 103 is called UPDATE_BDF, and is controlled by the font processing technician interactively or by commands stored in a configuration file and read by the program 103.

Initial input to UPDATE_BDF 103 includes a list of accented capital letters in a typeface which need to be decompressed. Then, for each typeface to be converted, UPDATE_BDF receives input of font metrics data from the font metrics file 28. Next, for each of the monitor resolutions (75 and 100 dpi), the font bitmap file 26 for each point size is converted. That is, if a typeface includes fonts for five possible point sizes, ten bitmap files are converted—five for 75 dpi monitors and five for 100 dpi monitors. This conversion is accomplished by present invention processor routine 107 called by main program 103 and executed by processor 105 without user interaction as follows.

Figure 15A:
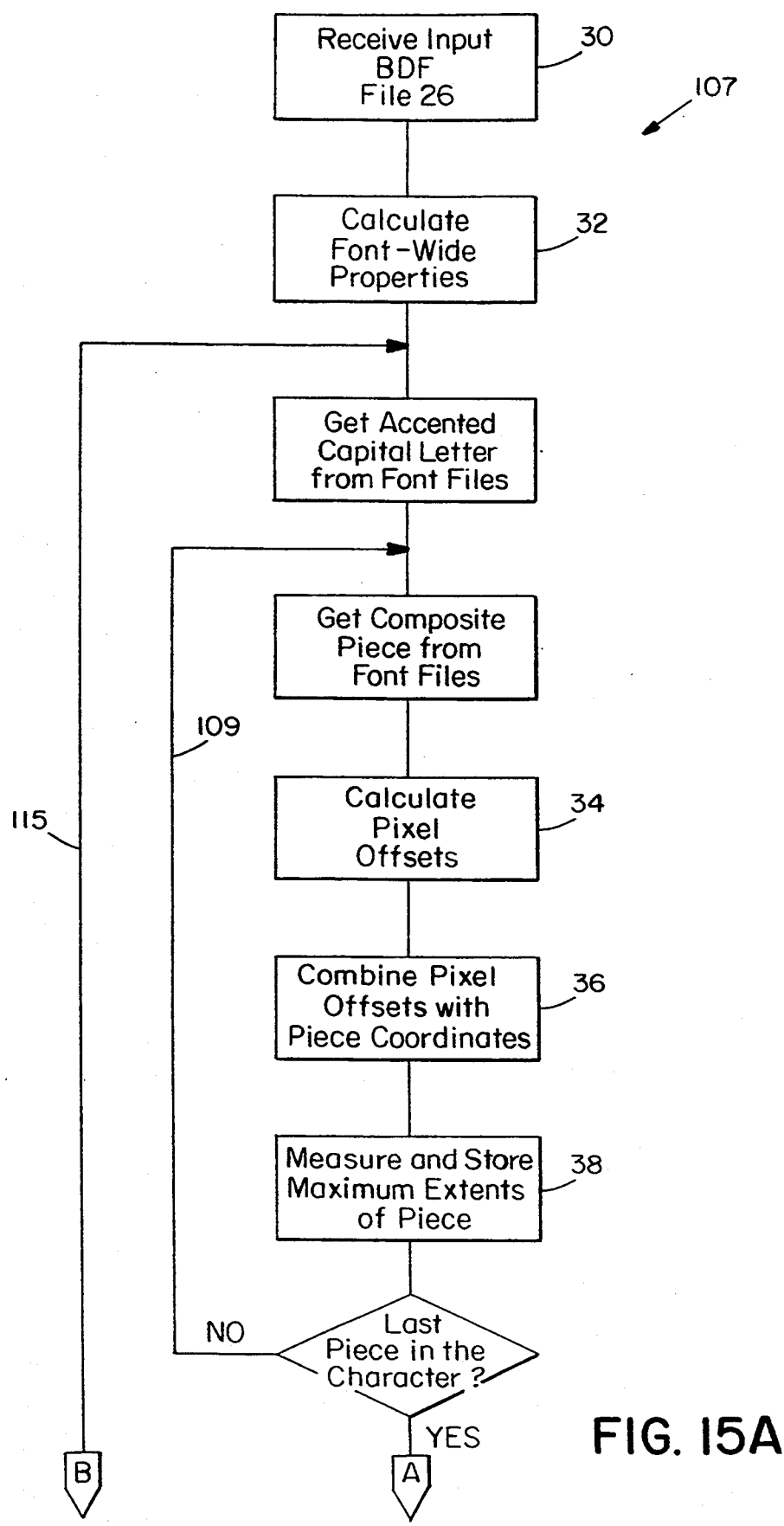
FIGS. 15A–15C are flow diagrams of the present invention bitmap file processing and conversion routine.
Figure 15B:
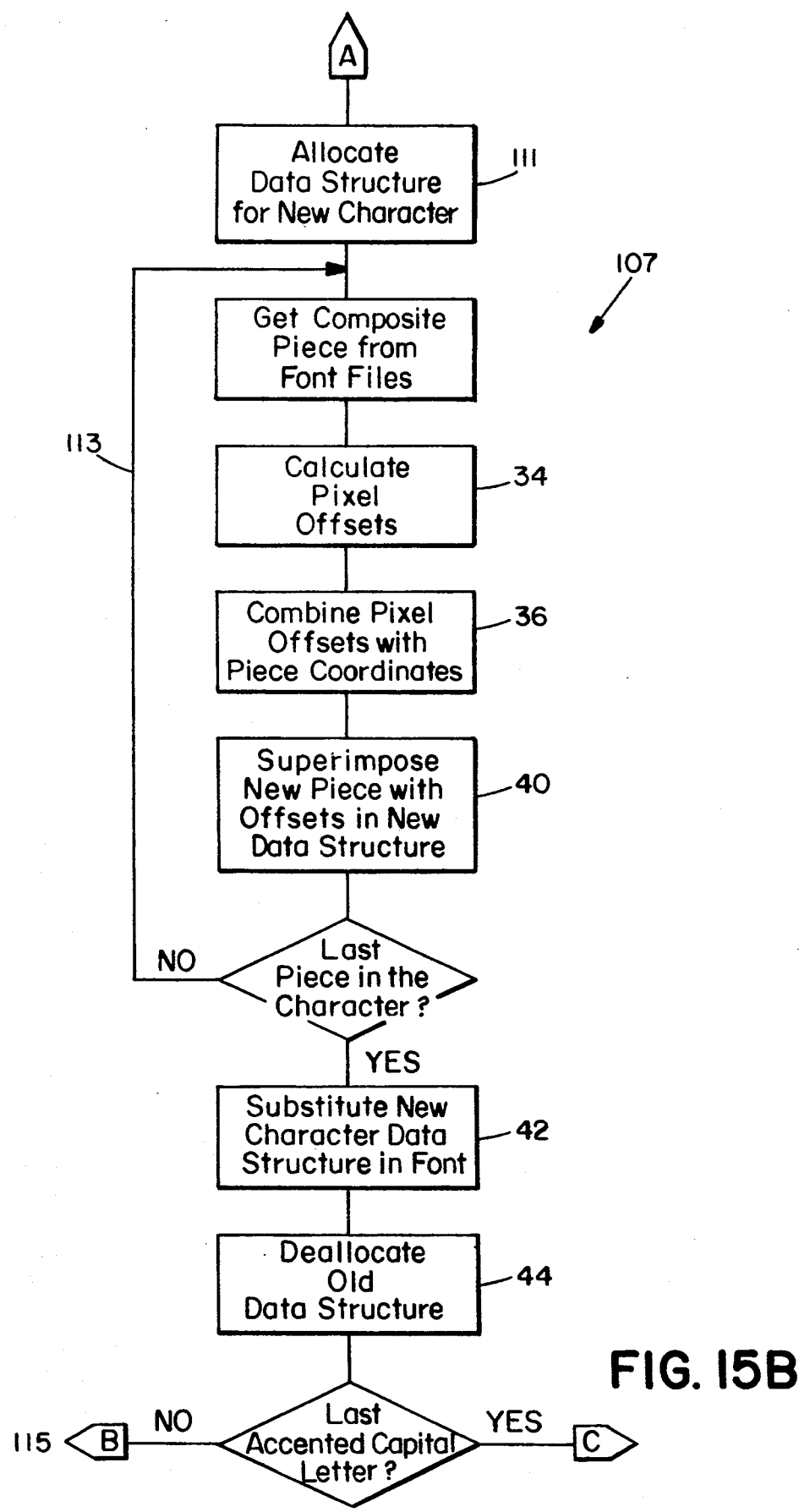
Figure 15C:
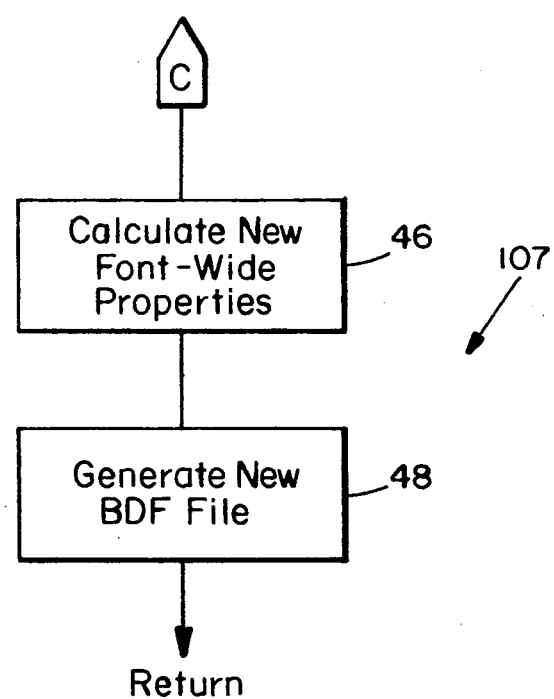

FIGS. 15A–C provide a flow diagram for the bitmap file conversion process/processor routine 107. First, at 30 in FIG. 15A processor routine 107 receives as input from the main program 103 the BDF file 26 (FIG. 1). Then at 32, processor routine 107 calculates font-wide properties. These properties include the maximum extent of characters in the font. Then, for each accented capital letter (more generally, composite character) to be converted, the routine 107 follows steps of outer loop 115 (FIGS. 15A and B) and processes each piece in the composite character.

For example, when processing the Agrave character, the pieces processed are the capital A and the grave accent. First, routine 107 finds the capital A in the BDF data and the font metrics data and processes it. The capital A that is processed is the full-sized capital A in the font, not the compressed capital. A which was part of the Agrave composite character. So, the resulting composite character will have a full-sized capital A for its base piece. Then, routine 107 processes the grave accent in a similar manner.

Each composite character is processed twice. The purpose of the first pass through the character data is to allocate space for the data structure which will eventually store the converted composite character. In that first pass, each piece of the composite character is processed in loop 109 as follows. For a given piece, routine 107 calculates pixel offsets at step 34 (FIG. 15A). In one mode, pixel offsets are calculated to locate the center of the accent piece over the center of the full-sized base piece. In a second mode, offset data is read from the font metrics file. If the piece is a base piece, the offset is zero. But, for accents, non-zero offsets are calculated. The process of calculating pixel offsets at step 34 is discussed below in detail. Next, at step 36, routine 107 combines the calculated pixel offsets with the piece coordinates. Then, the extents of the new piece are measured and recorded at step 38 so space can be allocated for the new composite character data structure. The foregoing steps of loop 109 are repeated for each piece in the composite character (i.e., usually performed a total of two times—once for the base piece and repeated for one accent piece).

When each piece in the composite character has been processed, the new data structure is allocated at 111 in FIG. 15B. Then, the steps of loop 109 are repeated but at loop 113 in FIG. 15B. This second time through the loop 109 steps, however, after the pixel offsets are combined with piece coordinates at 36 (FIG. 15B), the new coordinates of the accent piece are superimposed over the data for the full-sized base piece in the new data structure at step 40 (FIG. 15B). Thus, a new decompressed composite character is created. The newly created character data structure is then substituted 42 for the old compressed character data structure. The old data structure is then deallocated 44.

Routine 107 repeats the foregoing steps of outer loop 115 (FIGS. 15A–15B), for each composite character in the subject font to be converted. When all of the target composite characters have been converted, routine 107 calculates at 46 (FIG. 15C) a new set of font-wide properties, and generates a new BDF file at step 48 (FIG. 15C). Routine 107 then returns to main program 103 which subsequently and repeatedly calls routine 107 for conversion of display font bitmaps in each desired monitor resolution of each font.

Calculation of pixel offsets at step 34 (FIGS. 15A–B) is performed in one of two modes. In the center accent mode, pixel offsets are calculated such that, when they are added to the coordinates of the accent piece and when the accent piece and the full-sized base piece are superimposed, the accent piece and the base piece are centered along a common longitudinal axis (y-axis), with the accent piece being situated above the base piece along the longitudinal axis. The center accent mode is used in cases where composite character font metrics data is not available. In the font metrics mode, composite character data from the font metrics file 28 is used to offset the accent piece by the proper amount. The mode used is selectable by the font processing technician in a configuration file read by the main program 103 before processing begins.

Figure 16A:
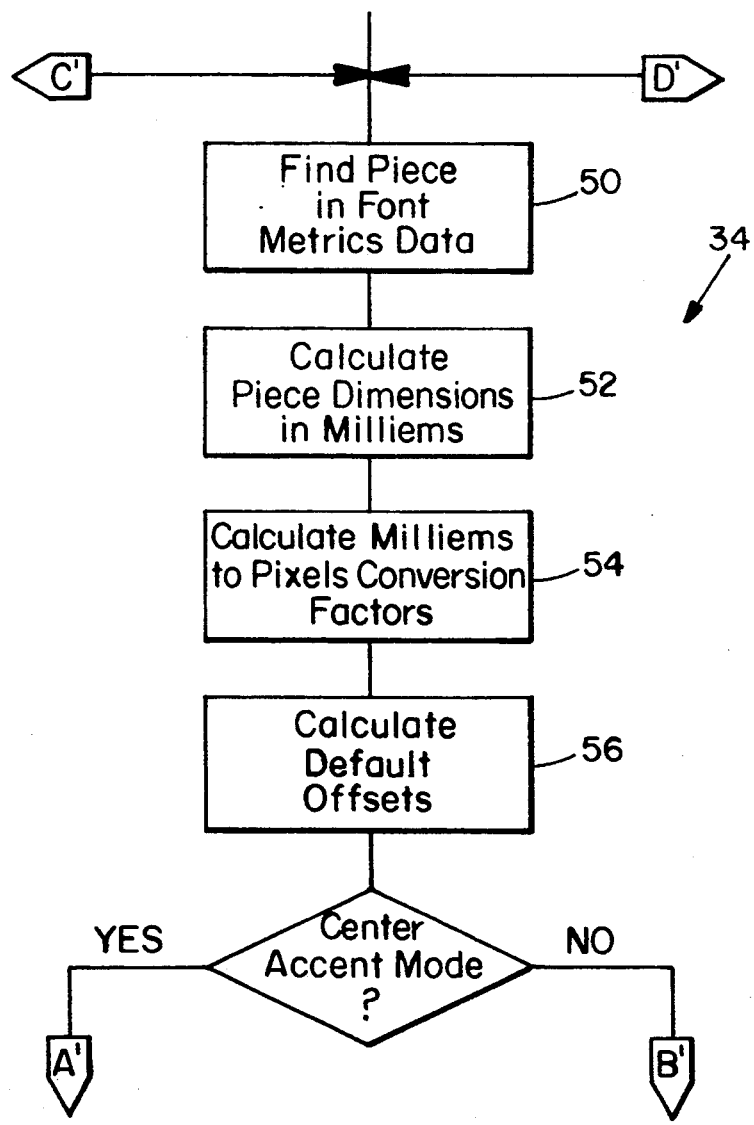
FIGS. 16A–16C are flow diagrams for the calculation of pixel offsets performed by the present invention.
Figure 16B:
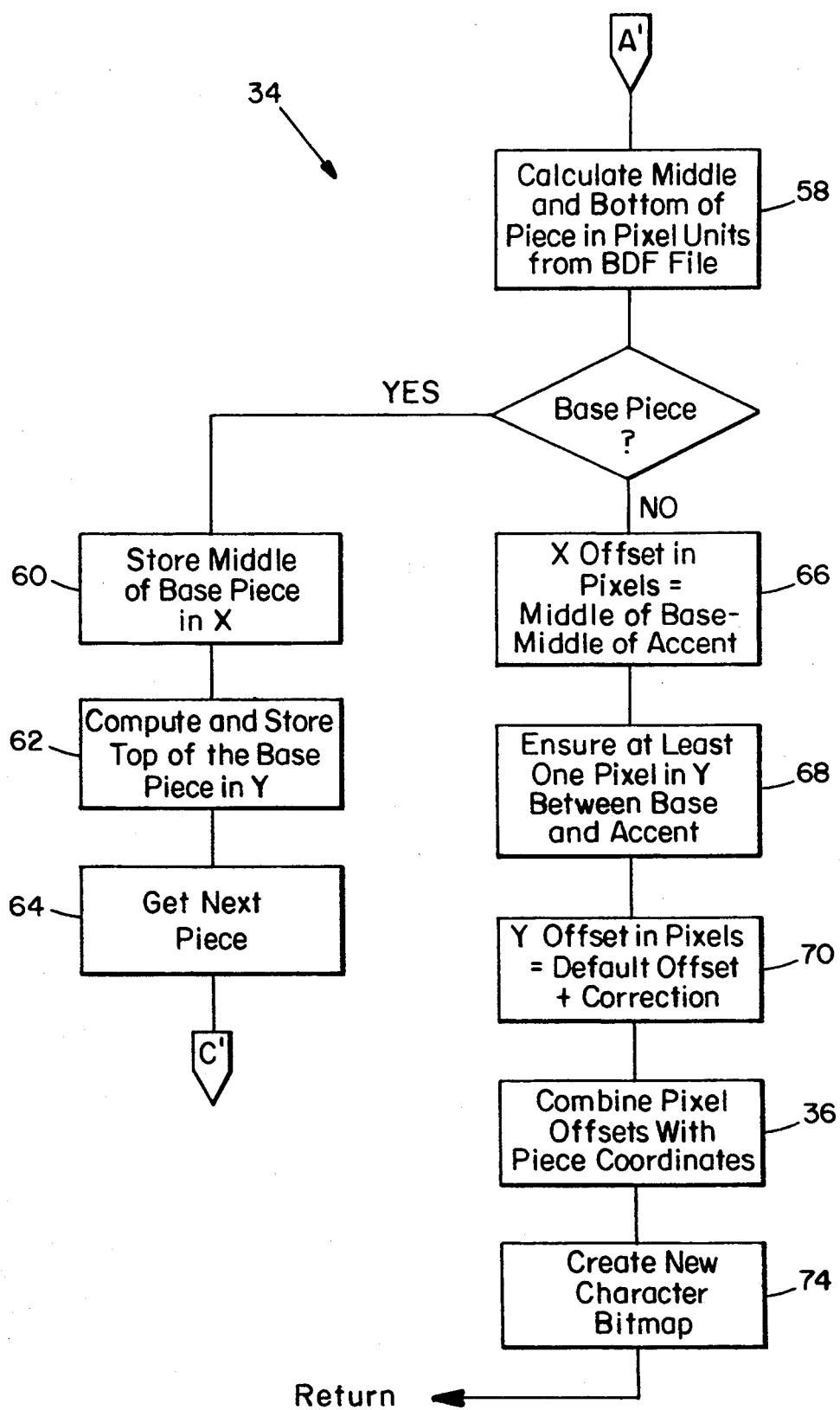
Figure 16C:
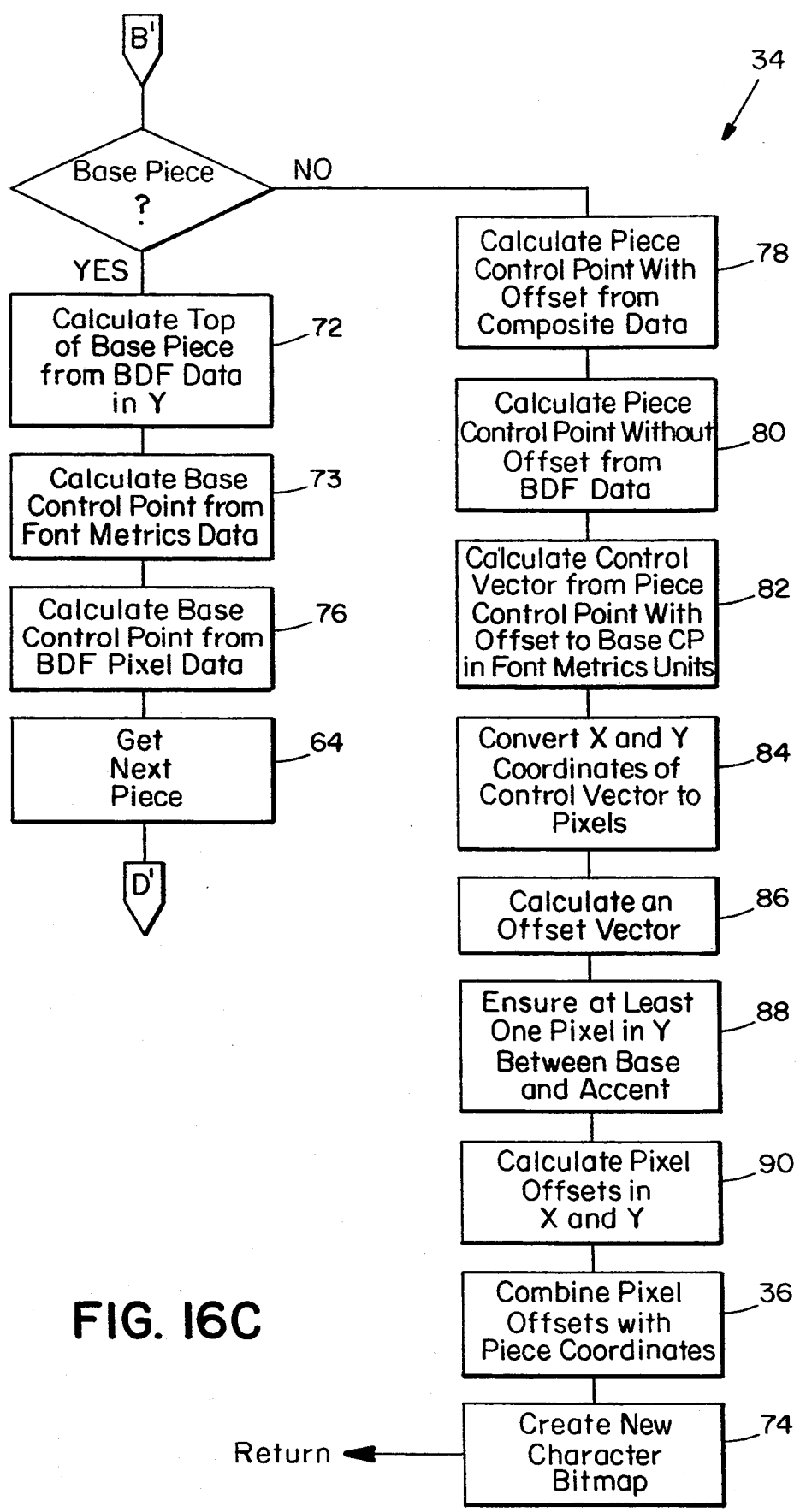

FIGS. 16A–C provide a flow diagram of the pixel offset process/step 34 in FIGS. 15A and B. When the process 34 begins, the metrics data for the composite character piece to be processed is located in the font metrics file 28 (step 50 in FIG. 16A), and the bounding box and dimensions of the subject piece are calculated in metrics units (step 52 in FIG. 16A). The dimensions are calculated according to the relationships $$afm\_piece\_width = urx - llx$$

$$afm\_piece\_height = ury - lly,$$

where urx and ury are the x and y coordinates of the upper right corner of the bounding box, and llx and lly are the x and y coordinates of the lower left corner of the bounding box. Next, conversion factors are calculated at 54 to convert the font metrics data from units of metrics units to units of pixels. The conversation factor equations are $$y\_factor = \frac{monitor\ resolution}{72.27} \times \frac{point\ size}{1000}$$

$$x\_factor = y\_factor.$$

The monitor resolution is in dots per inch and is typically either 75 or 100. The constant 72.27 represents the number of typographic points per inch. Default offsets are then calculated at 56 (FIG. 16A) by $$x\_offset = INT[deltax * x\_factor + x\_round]$$

$$y\_offset = INT[deltay * y\_factor + y\_round],$$

where deltax and deltay are the offsets of the piece in x and y, respectively, given by the composite data in the font metrics file 28. The processor function INT has the effect of converting real numbers to fractionless integers. Rounding offsets x_round and y_round are added to effect uniform rounding regardless of the sign of the deltax or deltay value. If deltax is negative, x_round = −0.5. If it is positive, x_round = +0.5. If deltay is negative, y_round = −0.5. If it is positive, y_round = +0.5.

If processor routine 107 is in center accent mode, the middle of the composite character piece in the x-direction and the bottom of the subject piece in the y-direction are then calculated at 58 (FIG. 16B) from BDF file 26 data. This is accomplished using the following relationships $$mid\_x = BBox + BBw/2$$

$$piece\_bottom = BBoy + y\_offset$$

BBox and BBoy are the offsets in x and y, respectively, of the subject piece bounding box from the origin. BBw is the width of the bounding box, and y_offset is the default offset calculated at 56 in FIG. 16A. If the subject piece is a base piece, the pixel at the middle of the top of the piece is stored 60, 62. That is, the middle is calculated along the x-axis and the top is calculated along the y-axis as follows $$\text{base\_mid\_x} = \text{mid\_x}$$

$$\text{base\_top\_y} = BBoy + BBh - 1$$

BBh is the height of the bounding box. Then, the next piece to be processed (e.g., an accent piece) is retrieved at 64, and the process repeats from step 50 (FIG. 16A).

If the piece being processed is an accent piece (i.e., not a base piece), the pixel offsets are calculated at steps 66 and 70 (FIG. 16B) to locate the middle of the accent piece (in the x direction) directly above the middle of the base piece along the x-axis, with at least one pixel space in the y-direction between the two pieces (step 68). The pixel offsets of steps 66 and 70 follow the relationship $$x\_offset = \text{base\_mid\_x} - \text{mid\_x}$$

$$y\_offset = \text{piece\_bottom} - BBoy$$

If the font metrics file 28 indicates that the font is italic or oblique or some other slant style, then an additional adjustment is made to the x-offset by the following.

$$\text{slant\_tangent} = \tan[-\text{afm\_italic\_angle} * (\pi - 180)]$$
$$x\_offset = x\_offset + INT[(0.5 * \text{piece\_bottom} * \text{slant\_tangent}) + 0.5]$$

In the above, afm_italic_angle is a data value supplied in the font metrics file 28. It is defined as the angle of the dominant vertical strokes of the font expressed in degrees counter clockwise from the vertical. The offsets are then combined with the pixel data for the subject piece at 36, and a new bitmap for the generated composite character is created at 74 (FIG. 16B). Processing returns to step 36 in FIGS. 15A,B.

If processor routine 107 is in font metrics mode, the process proceeds differently than in the center accent mode of FIGS. 16A and B. If the piece is a base piece, the top of the base piece in the y-direction is calculated at 72 (FIG. 1C) first from BDF pixel data, where base_top_y=BBoy+BBL−1. Next, a control point at the middle of the top of the base is defined in metrics units at step 73 and in pixels at step 76. This is accomplished according to the relationships $$\text{base\_cp\_x} = llx + \text{afm\_piece\_width}/2$$

$$\text{base\_cp\_y} = lly + \text{afm\_piece\_height} - 1$$

$$\text{base\_cp\_pixel\_x} = BBox + BBw/2$$

$$\text{base\_cp\_pixel\_y} = \text{base\_top\_y}$$

The next piece, an accent, is then retrieved at 64 for processing beginning with step 50 in FIG. 16A.

If the piece is an accent piece in the font metrics mode, two control points are defined in FIG. 16C. The first control point 78 is the middle of the bottom of the accent piece with the offset defined by the composite data in the font metrics file 28. The x, y coordinates of the first control point (piece_cp_x and piece_cp_y) are defined by $$\text{piece\_cp\_x} = llx + \text{deltax} + \text{afm\_piece\_width}/2$$

$$\text{piece\_cp\_y} = lly + \text{deltay}.$$

The second control point 80 is the middle of the bottom of the accent piece as it is defined in the BDF data 26, i.e., where it presently resides in the bitmap without any offset. The x, y coordinates of this second control point are referenced piece_cp_pixel_x and piece_cp_pixel_y, and are defined as $$\text{piece\_cp\_pixel\_x} = BBox + BBw/2$$

$$\text{piece\_cp\_pixel\_y} = BBoy.$$

Next, a control vector is calculated at step 82 (FIG. 16C). The control vector extends from the second control point on the top of the base piece to the first control point at the bottom of the offset accent piece. The control vector is thus expressed in x and y coordinates referenced cv_afm_x and cv_afm_y, and in metrics units as follows $$cv\_afm\_x = \text{piece\_cp\_x} - \text{base\_cp\_x}$$

$$cv\_afm\_y = \text{piece\_cp\_y} - \text{base\_cp\_y}.$$

The control vector coordinates are then converted at step 84 from metrics units to pixel units according to the relationships $$cv\_pixel\_x = INT[x\_factor * cv\_afm\_x + 0.5]$$

$$cv\_pixel\_y = INT[y\_factor * cv\_afm\_y + 0.5].$$

An offset vector is then calculated at step 86 (FIG. 16C). The offset vector is expressed in pixel units in x and y coordinates. The vector extends from the pixel control point on the top of the base piece (i.e., the second control point) to the point in the bitmap where the control point in the accent piece will be located in the decompressed character. Thus, the coordinates of the offset vector indicate the number of pixels in x and y that the accent piece should be shifted in relation to the base piece when the new bitmap is created.

$$x\_offset = \text{base\_cp\_pixel\_x} - \text{piece\_cp\_pixel\_x} + cv\_pixel\_x$$

$$y\_offset = \text{base\_cp\_pixel\_y} - \text{piece\_cp\_pixel\_y} + cv\_pixel\_y$$

The offsets are then combined with the old bitmap accent piece data at step 36, and a new bitmap for the generated composite character is created at 74 (FIG. 16C). Processing returns to step 36 in FIGS. 15A,B.

Referring back to FIG. 17, the software program (UPDATE_BDF) 103 employing the conversion routine 107 of the present invention is executable on any compatible digital processor 105 desired. That is, digital processor 105 may be a stand-alone PC, minicomputer or mainframe, or may be the host processor 15 or any workstation processing unit 19 of the computer network system 13 (FIG. 1). To that end, the present invention conversion of font bitmaps may take place (i) locally or remote to subject display subsystem 16 having character height restrictions, and (ii) locally or remote to desired computer display systems having no such restrictions, on which the generated converted font bitmaps 26' are intended to be used. In any case, input of the font metrics files 28 and font bitmaps 26 of fonts of interest to program 103 is by floppy disks, magnetic tape or other portable or transmittable media carrying copies of the font files 28 and font bitmaps 26. Similarly, output of generated converted font bitmaps 26' (i.e., font bitmaps 26 modified/adjusted by bitmap representations of composite characters formed of full sized decompressed pieces substituted for bitmap representations of the composite characters in compressed form) is by way of copies of the converted font bitmaps 26' on portable media. The generated output converted font bitmaps 26' are then portable to desired computer display systems, especially those having no restrictions on character height, for use therein.

While this invention has been particularly shown and described with references to preferred embodiments thereof, it will be understood by those skilled in the art that various changes in form and details may be made therein without departing from the spirit and scope of the invention as defined by the appended claims. For example, throughout the foregoing description where accented capital letters are discussed, it is understood that capital letters with other diacritical marks are treated similarly.

I claim:

1. In a digital processor, a method of converting compressed composite characters of a display font comprising the steps of:

selecting the compressed composite characters from display font bitmaps of the display font, each bitmap representation of a selected compressed composite character in the display font bitmaps comprising a bitmap representation of a compressed base piece and a bitmap representation of at least one other piece and the display font bitmaps comprising a bitmap representation of a full-sized form of each compressed base piece;

converting each selected compressed composite character to a full-sized decompressed composite character by combining the bitmap representation of the full-sized form of each compressed base piece with the bitmap representations of the other pieces of each selected compressed composite character, said converting being performed independent of user interaction;

generating converted bitmap representations of the full-sized decompressed composite characters; and adding the converted bitmap representations of the full-sized decompressed composite characters to the display font bitmaps to support display of said selected compressed composite characters in full size on a display system.

2. A method as claimed in claim 1 wherein: the step of converting includes:

reading character data from a font metrics file of the font, said character data including sizes of characters in the font, sizes of pieces of the selected composite characters including base pieces and other pieces, and position offsets of pieces in the selected composite characters referenced to respective base pieces of the selected composite characters, said position offsets being defined in font metrics units;

converting the position offsets of the other pieces in the selected composite characters to pixel offsets of the other pieces; and for each piece in the selected composite characters, combining the pixel offsets with a bitmap representation of the piece to form an adjusted bitmap representation of the piece in full size; and the step of generating converted bitmap representations includes combining the adjusted bitmap representations of base pieces with the adjusted bitmap representations of the respective other pieces, such that for each selected composite character, the adjusted bitmap representation of the base piece of the selected composite character is combined with the adjusted bitmap representation of respective other pieces of the selected composite character to form the representation of the selected composite character in full size.

3. A method as claimed in claim 1 wherein the step of generating converted bitmap representations of the full-sized decompressed composite characters includes generating adjusted display font bitmaps by modifying the display font bitmaps to include the full-sized decompressed characters.

4. In a digital processor having a memory, a method of converting font bitmaps of compressed composite characters for full-size character display, comprising the steps of:

storing in the memory a font metrics file and corresponding display font bitmaps for presenting compressed characters of a desired font to a computer display system, the display font bitmaps providing representations of at least (a) full-sized characters including capital letters, and (b) compressed characters including composite characters in the font, each composite character being formed of more than one piece and one of said pieces being a base piece formed of a compressed form of a full-sized character in the font;

from the stored display font bitmaps, selecting desired compressed characters including composite characters;

using the fount metrics file in the memory, for each selected compressed character, converting the stored display font bitmap representation of the character to a representation of the character decompressed to full size by combining the bitmap representation of each full-sized form of each compressed base piece with the bitmap representations of the other pieces of each selected compressed composite character;

adding the decompressed representations to the stored display font bitmaps, such that the display font bitmaps support display of the decompressed characters in full size.

5. A method as claimed in claim 4 wherein:

the step of selecting compressed characters includes selecting from the stored display font bitmaps composite characters having base pieces which comprise corresponding equivalent capital letters in the font, but in compressed form; and the step of converting includes for each selected composite character, forming a representation of the composite character having a base piece comprising the corresponding equivalent capital letter decompressed to full size in the font.

6. A method as claimed in claim 5 wherein:

the selected composite characters further comprise other pieces comprising diacritical marks in the font;

the stored display font bitmaps further provide bitmap representations of the diacritical marks; and the step of converting further includes for each selected composite character, forming a representation of the composite character by combining the provided display font bitmap representation of the corresponding equivalent full-sized capital letter and the stored display font bitmap representation of a respective diacritical mark for each of the other pieces in the selected composite character.

7. A method as claimed in claim 4 wherein:

the step of providing includes storing the display font bitmaps in a bitmap distribution format file read by the computer display system to display characters; and the step of adding includes modifying the bitmap distribution format file to create a modified bitmap distribution format file which contains the representations of the decompressed characters, the modified bitmap distribution format file supporting display of characters in full size.

8. A method as claimed in claim 7 wherein:

(a) the stored display font bitmaps provide separate representations of the pieces in composite characters; and (b) the step of converting includes converting the selected composite characters by:

(i) reading character data from the font metrics file, including the sizes of characters in the font, the sizes of pieces of the selected composite characters, and position offsets of other pieces in the selected composite characters referenced to respective base pieces of the selected composite characters, said position offsets being defined in font metrics units;

(ii) converting the position offsets of pieces in the selected composite characters to pixel offsets being compatible with the bitmap distribution format file;

(iii) for each piece in the selected composite characters, adding the determined pixel offsets to the stored display font bitmap representation of the piece to form an adjusted bitmap representation of the piece in full size; and (iv) forming decompressed representations of the selected composite characters by combining the adjusted bitmap representations of base pieces with the adjusted bitmap representations of the respective other pieces, such that for each selected composite character, the adjusted bitmap representation of the base piece of the selected composite character is combined with the adjusted bitmap representation of respective other pieces of the selected composite character to form the working representation of the selected composite character in full size.

9. A computer apparatus for converting compressed characters of a display font, comprising:

a memory storing font metrics files and corresponding display font bitmaps presenting characters of a desired font for display on a computer display system, the display font bitmaps providing representations of at least (a) full-sized characters including capital letters, and (b) compressed characters including composite characters in the font, each composite character being formed of more than one piece said pieces comprising a base piece formed of a compressed form of a full-sized character in the font and other pieces;

a processor coupled to the memory for:

(i) executing a selection module under control of the computer apparatus for accessing the memory and for selecting desired compressed characters including composite characters from the display font bitmaps and;

(ii) executing a processor routine to automatically convert the stored font bitmap representation of each selected compressed character to a decompressed representation of the character decompressed to full size by combining the bitmap representation of each full-sized form of each compressed base piece with the bitmap representations of the other pieces of each selected compressed composite character, the processor routine accessing the memory and using the font metrics file to convert the bitmap representation of each selected character; and bitmap generation means coupled to receive the decompressed representations from the processor routine and to add the decompressed representations for the selected composite characters to the stored display font bitmaps to support display of the selected composite characters in full size.

10. Computer apparatus as claimed in claim 9 wherein:

the selected compressed characters include composite characters having a base piece comprising a capital letter in the font, but in compressed form; and for each selected composite character, the processor routine forms a decompressed representation of the composite character having a base piece comprising the respective corresponding equivalent capital letter in the font decompressed to full size.

11. Computer apparatus as claimed in claim 10 wherein:

the selected composite characters further comprise other pieces comprising diacritical marks in the font;

the display font bitmaps further provide representations of the other pieces; and for each selected composite character, the processor routine forms a decompressed representation of the composite character by combining the stored display font bitmap representation of the corresponding equivalent full-sized capital letter and the display font bitmap representation of respective other pieces in the selected composite character.

12. Computer apparatus as claimed in claim 9 wherein:

the display font bitmaps are stored in the memory in a bitmap distribution format file read by the computer display system to display characters; and the bitmap generation means further modifies the bitmap distribution format file to create a modified bitmap distribution format file which contains the representations of the decompressed characters, the modified bitmap distribution format file supporting display of characters in full size.

13. Computer apparatus as claimed in claim 12 wherein:

(a) the display font bitmaps stored in the memory provide separate representations of the pieces in composite characters; and (b) for converting selected composite characters, the processor routine includes:
  (i) a reading module for reading character data from the font metrics file, said data including the sizes of characters in the font, the sizes of pieces of the selected composite characters, and position offsets formed of indications of relative positions of other pieces in the selected composite characters referenced to respective base pieces, said position offsets being defined in font metrics units;
  (ii) a processing module coupled to the reading module for converting the position offsets of pieces in the selected composite characters to pixel offsets, the pixel offsets being compatible with the bitmap distribution format file;
  (iii) a data adding module responsive to the processing module, for each piece in the selected composite characters, the data adding module adding the determined pixel offsets to the stored display font bitmap representation of the piece, to form an adjusted bitmap representation of the piece in full size; and
  (iv) a combiner coupled to the data adding module for forming decompressed representations of the selected composite characters by combining the adjusted bitmap representations of base pieces with the adjusted bitmap representations of the respective other pieces, such that for each selected composite character, the adjusted bitmap representation of the base piece of the selected composite character is combined with the adjusted bitmap representation of the other pieces of the selected composite character to form the working representation of the selected composite character in full size.

* * * * *